Oct. 19, 1954  E. BENNETT  2,692,322
INDUCTION WELDING METHOD AND APPARATUS
Filed Nov. 24, 1950
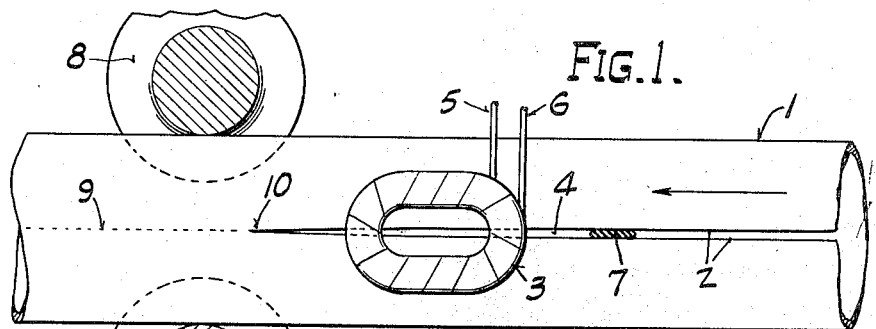
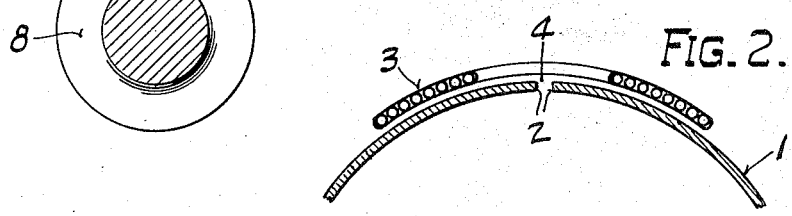
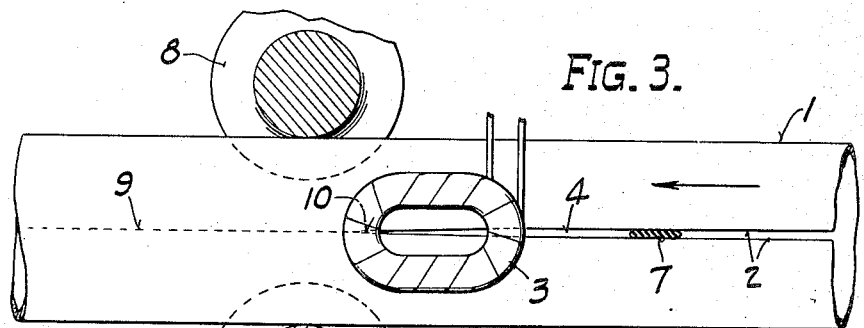
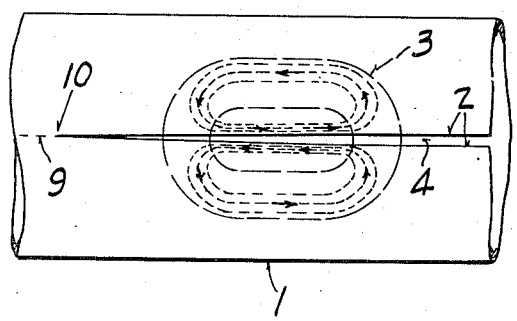
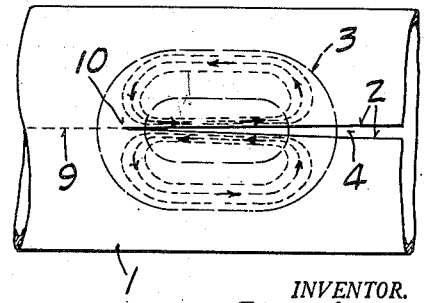
INVENTOR.
Edward Bennett
BY
ATTORNEYS.

Patented Oct. 19, 1954

2,692,322

UNITED STATES PATENT OFFICE 2,692,322

INDUCTION WELDING METHOD AND APPARATUS

Edward Bennett, Madison, Wis., assignor to A. O. Smith Corporation, Milwaukee, Wis., a corporation of New York Application November 24, 1950, Serial No. 197,400

7 Claims. (Cl. 219—6)

This invention relates to a welding method and apparatus, and particularly to the welding of metal articles by induction heating the edges thereof.

An object of the invention is to provide a welding method and apparatus whereby the longitudinal seams of pipe and the like may be welded with a high degree of uniformity.

Another object is to provide a method of and apparatus for rapidly mass producing large quantities of welded articles having uniformly high quality welds.

A further object is to provide an induction pipe welding apparatus wherein variations in the location of the point of contact, or apex, of the pipe edges being welded do not affect the uniformity of the resulting weld.

The invention, in general, comprises passing a tubular blank through the magnetic field of a suitable induction heating coil, preferably beneath the coil, applying a relatively high frequency alternating current to the coil to induce sets of circulating currents on opposite sides of the gap between the edges of the blank to bring the edges to welding temperature, and applying pressure forwardly of the coil to force the heated edges together and complete the weld. It is important that the point of application of the welding pressure, as well as the design and location of the spacer which holds the edges apart while the blank passes beneath the inducing coil, be such that the converging edges come into contact substantially forwardly of the stronger portion of the field of the coil so that variations in the location of the point of contact will not render the heating non-uniform.

Other objects and advantages of the invention will be set forth more fully in the following description of an embodiment of the invention illustrated in the accompanying drawings.

In the drawings:

Figure 1 is a plan view, partly in section, illustrating the invention as applied in welding the longitudinal seam of a pipe;

Fig. 2 is a cross-sectional view showing the relation between the induction coil and the pipe being welded;

Fig. 3 is a plan view corresponding to Fig. 1 and showing, generally, an extreme rear position of the point of contact, or apex, of the pipe edges permissible in the production of a uniform weld;

Fig. 4 illustrates the paths of the induced currents in the arrangement shown in Fig. 1; and Fig. 5 shows the absence of induced current flow across the apex even under the arrangement of Fig. 3.

The invention is illustrated in the drawings as applied to a tubular pipe blank 1 formed in any suitable manner and having longitudinal edges 2 positioned opposite each other for welding into the finished pipe. Although the invention is particularly adapted for welding the longitudinal seams of relatively large diameter pipes, it may also be employed in manufacturing smaller pipes or tubing or in the butt welding of plates.

The apparatus employed in carrying out the method of the invention may comprise a hollow centered inducing coil 3 suitably supported in contiguous straddling relation with a gap 4 between the edges 2. The coil 3 is preferably constructed of spiraled copper tubing and is formed in the shape of a saddle to conform to the curvature of the pipe blank.

As is conventional with induction coils, water may be passed through the tubing to prevent overheating as a result of the heavy currents flowing therein. These currents are generated by a suitable source of relatively high frequency alternating current, for example a motor-driven high frequency alternator, connected to the ends 5 and 6 of the tube.

As indicated by the arrows in Figs. 1 and 3, the pipe blank 1 is passed beneath the inducing coil 3 by suitable conveyor means, not shown. In order to form the gap 4, a stationary spacer 7 is supported rearwardly of coil 3 between the cold edges 2 of the blank. After passing beneath the inducing coil the heated edges are forced together by a pair of pressure rolls 8 journaled forwardly of the coil, so that the finished weld 9 is made somewhat forwardly of the point of contact or apex 10 of the edges.

Pipe seam welding has previously been performed with an annular inducing coil encircling the pipe blank and concentric therewith. With such apparatus the induced currents flow in a single circuit circumferentially around the back of the blank, in opposite directions along the edges of the blank between the coil and the apex, and around the apex of the edges, regardless of where the apex may be. The heating, where the apex is positioned forwardly of the heating element, occurs mainly along the edges of the blank between the heating coil and the apex.

As the blank passes through the welding apparatus, considerable variation in the location of the contact apex is certain to occur. This is because of differences in the stiffness of the blank, in the smoothness of the edges, or because of other factors. In practice it has been found that the apex jumps back and forth erratically over a considerable length of seam.

As the result of the variation in apex location, the length of edge between an encircling coil and the apex also varies and the amount of heating caused by induced currents flowing in opposite directions along the edges and around the apex differs accordingly. For example, with certain blanks, or in certain portions of the same blank, the edges will be excessively heated and poor welds with pin holes will be made. In other blanks, on the other hand, the heating will be inadequate and an improper bond will result.

The above mentioned disadvantages are also present where a pancake or saddle shaped coil is employed and the apex is disposed within the main portion of the magnetic field adjacent the coil. Here again, current flows in a single circuit around the apex and the variations in the location thereof alter the heating and the weld quality.

According to the present invention, the apparatus is arranged so that the apex 10 is disposed a sufficient distance forwardly of the coil 3 to prevent the flow of any substantial induced currents therearound. Variations in the location of the apex, therefore, have no effect on the weld quality and highly uniform welds are obtained.

In determining the location of the apex 10 under the invention, the following considerations must be taken into account. The apex must be disposed substantially forwardly of the stronger portion of the magnetic field of the coil as shown in Figs. 1 and 4, but not so far forwardly that excessive cooling will occur before the edges are forced together to form the weld. The apex location illustrated in Figs. 3 and 5, although within the weaker portion of the magnetic field of coil 3, has been found to be approximately the extreme rear position for the apparatus shown at which no substantial current will flow around the apex. The extreme rear position, however, may vary with different apparatus and current frequencies, the important thing being that induced current does not flow around the apex.

Because of the described variations in apex position, the pressure rolls 9 and spacer 7 are preferably designed and arranged so that the apex 10 is substantially forward of the coil 3 and never jumps back far enough to cause induced current flow therearound.

In carrying out the method of the invention, the edges 2 of the blank are spaced a slight distance apart and caused, by the application of welding pressure, to converge at the apex 10. Relatively high frequency alternating currents are then induced, for example by the coil 3, on opposite sides of the gap 4. These currents are maintained in two separate groups or circuits, one on each side of the gap, by the use of a properly designed inducing means and by positioning the inducing means so that substantially no current flows around the apex 10.

As illustrated in Figs. 4 and 5, the opposed groups of currents are caused to flow in opposite directions along the respective pipe edges 2 beneath the coil. With the coil 3, for instance, the circulating current groups flow, respectively, in clockwise and counterclockwise circles due to the fact that the inducing current in the segments of the coil which are generally parallel to the gap 4 flow in opposite directions.

Because of this direction of current flow along the edges 2, and also because of the frequency employed and the slight distance between the edges, proximity effect causes high concentration of the induced circulating currents along the edges 2 and consequent rapid heating thereof to welding temperature.

During the above operations the blank is moved relatively to the inducing means and to the point of pressure application, so that a continuous weld is made between the heated edges 2.

For maximum efficiency and use of proximity effect, the inducing coil should be placed as closely as practicable to the blank and the edges 2 beneath the coil should be positioned closely together but without engaging each other. In addition, it is desirable that the taper between the edges beneath the coil be slight so that the proximity effect variation, caused by the taper, does not render the current distribution materially disuniform.

In practice, the frequencies employed are preferably 4,000 to 10,000 cycles per second and the inducing current values range to thousands of amperes. The pipe may be fed through the apparatus at 30 to 120 meters per minute, with the apex being disposed 8 to 16 centimeters forwardly of the induction coil. The very high temperature band along each edge will then be a millimeter or two wide depending upon the frequency, the spacing and thickness of the plates, the speed of welding, etc.

It has been found that the bridging of a current conductor across the gap 4 on the opposite side of the coil from the apex 10 will cause induced current to flow around the apex and also across the bridging conductor. In order to prevent this undesirable action, the spacer 7 is constructed of a suitable insulating material and the current groups on opposite sides of the gap 4 maintained separate. Alternatively, the spacer 7 may be formed of two wear-resistant metal members separated by insulation.

The described method and apparatus comprise a simple and highly effective means of obtaining uniformly high quality welded seams. Because of the use of proximity effect in concentrating the induced currents along the edges to be welded, the high temperature zone along the edges is narrow and welding is achieved with a relatively low power input.

The phrase "around the apex" and similar affirmative and negative expressions employed in the specification and claims are restricted to mean that induced currents flow across the heated seam forwardly of the apex, with the apex being analogous to an axis about which the induced currents turn. The expression is not used in its broad sense to mean merely near or in close proximity to the apex since it is within the scope of the invention for currents to flow near the apex so long as they do not cross the seam from one edge of the blank to the other.

Various embodiments of the invention may be employed within the scope of the accompanying claims.

I claim:

1. In a method of butt seam welding the edges of metal articles, the steps of arranging two edges in opposed relation with a gap therebetween, effecting relative movement between said edges and an induction heating coil with opposite sides of the coil being in contiguous straddling relation with respect to the gap between said edges to cause the induction into each of said edges of a separate set of circulating currents and consequently the heating of said edges to a welding temperature, and converging said edges into welding engagement at an apex disposed forwardly of the stronger portion of the magnetic field a distance sufficient to prevent the flow of substantial induced currents around said apex.

2. In a method of butt seam welding the longitudinal edges of a tubular blank, the steps of arranging said longitudinal edges in opposed relation with a slight gap therebetween, moving said edges part an induction heating coil with opposite sides of the coil being in straddling relation with respect to the gap between said edges to cause the induction into said blank of currents flowing in opposite directions along the respective edges, the current along one edge being separate and distinct from the current along the opposite edge and converging said edges into welding engagement at an apex disposed forwardly of the stronger portion of said magnetic field a distance sufficient to prevent the flow of substantial induced currents therearound, said frequency and said current directions operating through proximity effect to concentrate the induced currents along said edges and cause rapid heating thereof to welding temperature.

3. A method of butt seam welding the edges of metal articles, which comprises arranging two edges in opposed relation with a narrow gap therebetween, passing said edges adjacent an elongated induction heating element with the opposite sides of longer extent of the coil being in contiguous straddling relation with respect to the gap between said edges, simultaneously applying alternating current to said element to induce separate sets of circulating currents into the respective edge portions passing adjacent thereto and heat said portions to a welding temperature, and converging said heated edge portions into welding engagement at an apex located substantially forwardly of said heating element, said apex location being such that any substantial current flow therearound is prevented and variations in the location thereof rendered ineffective in altering the quality of the resulting weld.

4. A method of butt seam welding the longitudinal edges of a tubular blank, which comprises arranging said longitudinal edges in opposed relation with a narrow gap therebetween, moving said edges past a generally pancake shaped induction heating coil disposed in contiguous straddling relation with the path of travel of said edges, simultaneously applying relatively high frequency alternating current to said heating coil to cause the induction of currents flowing in opposite directions along the respective edge portions passing adjacent thereto, and converging said edges into welding engagement at an apex disposed substantially forwardly of said heating coil, whereby induced current flow around said apex is prevented and the proximity effect is utilized to cause concentration of the induced currents into narrow bands along said edge portions and consequent rapid heating of the edge portions to a welding temperature.

5. A method of progressively butt seam welding the opposed longitudinal edges of a tubular pipe blank, which comprises moving said edges past a saddle-like induction heating coil, spreading said edges to form a gap of predetermined width between the edge portions passing adjacent said coil, applying a relatively high frequency alternating current to said coil to cause the induction into each of said edge portions of a set of circulating currents and the rapid heating of said portions to a welding temperature, and converging said heated edge portions into welding engagement at an apex disposed substantially forwardly of said heating coil, said spreading operation being adapted to maintain said edges electrically separate rearwardly of said apex to thus prevent the flow of substantial induced currents around said apex and render variations in the location thereof ineffective in altering the quality of the resulting weld.

6. Induction pipe welding apparatus comprising a generally saddle shaped induction heating coil operable to induce circulating currents into the opposed edge portions of a tubular blank passing adjacent thereto and heat said portions to a welding temperature, a spacer member mounted rearwardly of said element in the line of travel of said edge portions to spread said edge portions prior to the induction heating thereof, and pressure means mounted forwardly of said element and disposed a sufficient distance from said element and spacer to converge said heated edges into welding engagement at an apex located substantially forwardly of said element, said apex location being such that substantial current flow therearound is prevented and variations in the location thereof rendered ineffective in altering the quality of the resulting weld.

7. Apparatus of the character described comprising a generally saddle shaped induction heating coil operable to induce circulating currents into the opposed edge portions of a tubular blank passing adjacent thereto and heat said portions to a welding temperature, a non-conducting spacer member mounted on one side of said coil in the line of travel of said edge portions to spread said edge portions prior to the induction heating thereof, and pressure rolls journaled on the opposite side of said coil from said spacer, said non-conducting spacer and said pressure rolls being disposed to cause convergence of said heated edge portions at an apex located forwardly of the stronger portion of the magnetic field of said element to prevent the flow of substantial induced currents around said apex.

References Cited in the file of this patent

UNITED STATES PATENTS

| Number | Name | Date |
|---|---|---|
| 1,915,047 | Blakeslee | June 20, 1933 |
| 1,937,945 | Correll | Dec. 5, 1933 |
| 2,632,840 | Sorensen | Mar. 24, 1953 |

FOREIGN PATENTS

| Number | Country | Date |
|---|---|---|
| 377,655 | Great Britain | |

(Open to public inspection 1932.)